United States Patent
Christian et al.

(10) Patent No.: US 7,842,129 B2
(45) Date of Patent: Nov. 30, 2010

(54) LACQUER FORMULATION FOR IMPROVING SURFACE PROPERTIES

(75) Inventors: Hans-Dieter Christian, Alzenau (DE); Reinhard Behl, Alzenau (DE); Hans-Werner Köhler, Bruchköbel (DE); Uwe Schmeier, Hasselroth (DE); Jürgen Meyer, Stockstadt (DE)

(73) Assignee: Evonik Degussa GmbH, Essen (DE)

( * ) Notice: Subject to any disclaimer, the term of this patent is extended or adjusted under 35 U.S.C. 154(b) by 838 days.

(21) Appl. No.: 11/150,434

(22) Filed: Jun. 13, 2005

(65) Prior Publication Data

US 2005/0282022 A1   Dec. 22, 2005

(30) Foreign Application Priority Data

Jun. 16, 2004   (DE) ............... 10 2004 029 074

(51) Int. Cl.
  *C09D 5/00*   (2006.01)
(52) U.S. Cl. .............. 106/287.34; 106/3; 106/31.01
(58) Field of Classification Search ............. 252/8.57; 106/3, 31.01, 287.34
  See application file for complete search history.

(56) References Cited

U.S. PATENT DOCUMENTS

| | | | |
|---|---|---|---|
| 4,221,896 A * | 9/1980 | Endo | ............ 528/28 |
| 4,344,858 A | 8/1982 | Zucker et al. | |
| 5,221,337 A | 6/1993 | Luers et al. | |
| 5,429,873 A | 7/1995 | Deusser et al. | |
| 5,672,198 A | 9/1997 | Belmont | |
| 5,747,562 A | 5/1998 | Mahmud et al. | |
| 5,749,950 A | 5/1998 | Mahmud et al. | |
| 5,959,005 A * | 9/1999 | Hartmann et al. | ............ 523/213 |
| 6,110,994 A | 8/2000 | Cooke et al. | |
| 6,159,275 A | 12/2000 | Otto et al. | |
| 6,169,129 B1 | 1/2001 | Mahmud et al. | |
| 6,191,122 B1 * | 2/2001 | Lux et al. | ............ 514/122 |
| 6,248,493 B1 * | 6/2001 | Ogura et al. | ............ 430/109.4 |
| 6,379,445 B1 | 4/2002 | Otto et al. | |
| 6,406,775 B1 * | 6/2002 | Houde | ............ 428/32.34 |
| 2002/0040661 A1 * | 4/2002 | Glaum et al. | ............ 106/287.35 |
| 2002/0173561 A1 * | 11/2002 | Field | ............ 523/216 |
| 2003/0125416 A1 * | 7/2003 | Munro et al. | ............ 523/171 |

FOREIGN PATENT DOCUMENTS

| | | |
|---|---|---|
| AU | 744979 | 7/1999 |
| EP | 0 341 383 A2 | 11/1989 |
| EP | 0904326 A1 | 3/1999 |
| EP | 0 924 271 A1 | 6/1999 |
| EP | 1 477 457 A1 | 11/2004 |
| JP | 4-187266 * | 7/1992 |
| JP | 8-170030 | 7/1996 |
| WO | WO 97/47698 | 12/1997 |
| WO | WO 01/42375 | 6/2001 |

OTHER PUBLICATIONS esp@cenet—English Abstract of EP 0924271.
Patent Family Search for EP 0904326.
DIN 55979.

* cited by examiner

*Primary Examiner*—Gregory R Del Cotto
*Assistant Examiner*—Amina Khan
(74) *Attorney, Agent, or Firm*—Oblon, Spivak, McClelland, Maier & Neustadt, L.L.P.

(57) ABSTRACT

A coating formulation containing at least one surface-modified silicon dioxide having a 60° reflectometer value of <3 and a black number $M_y$ of at least 140 has excellent performance properties, for example, a very good transparency.

18 Claims, No Drawings

LACQUER FORMULATION FOR IMPROVING SURFACE PROPERTIES

BACKGROUND OF THE INVENTION

1. Field of the Invention

The present invention relates to a lacquer formulation comprising a surface-modified silicon dioxide and having improved performance properties, and to its use.

2. Discussion of the Background

Clearcoat materials are extensively employed industrially for coating a very wide variety of surfaces, such as those of wood, plastics or metals, for example (Ulmann, 4th edition, volume 15, p. 589 ff.). Since generally the intention is that the surface of the coated article should be readily recognizable, the transparency of such coating materials is one of their most essential properties. The surfaces to be coated often have a high gloss. In many cases, therefore, the coating material is subject to the requirement that the surface should appear matt. This can be achieved through the addition of matting (or flatting) agents, which are incorporated into the clearcoat material.

These matting agents are composed of natural materials or are prepared synthetically. They are in the form of fine particles (approximately 1 to 30 μm) and ideally have the following properties: high pore volume, narrow particle distribution, suitable particle size, tailored to the respective application, and narrow pore distribution. Matting agents commonly employed include silicas (both precipitated silicas and silicas prepared on the basis of pyrogenic silicas) and/or silica gels.

When matting agents are used a problem which may occur is that the transparency of the clearcoat material is adversely affected in accordance with the particle size and refractive index both of the coating material and of the matting agent. This becomes particularly apparent when the clearcoat material is applied to a glossy black substrate. If transparency is poor the black surface appears to the viewer to be grayish, which is an unwanted phenomenon in application.

SUMMARY OF THE INVENTION

It is an object of the present invention to provide lacquer formulations in which the abovementioned drawbacks have been obviated at least to some extent. The lacquer formulations of the present invention should in particular exhibit improved performance properties such as, for example, a very good transparency.

This and other objects have been achieved by the present invention the first embodiment of which includes a lacquer formulation, comprising:

at least one surface-modified silicon dioxide having a 60° reflectometer value of <3 and a black number $M_y$ of at least 140.

In another embodiment, the present invention relates to a method for coating an article, comprising:

contacting said article with a lacquer formulation as described above.

In yet another embodiment, the present invention relates to an article, coated with a lacquer formulation as described above.

DETAILED DESCRIPTION OF THE INVENTION

The present invention accordingly provides lacquer formulations comprising at least one surface-modified silicon dioxide having a 60° reflectometer value of <3 with a black number $M_y$ of at least 140. The 60° reflectometer value includes all values and subvalues between 0 and <3, especially including 0.2, 0.4, 0.6, 0.8, 1, 1.2, 1.4, 1.6, 1.8, 2, 2.2, 2.4, 2.6, and 2.8. The black number $M_y$ is preferably at least 140, more preferably at least 142 and most preferably at least 144. The black number $M_y$ is preferably up to 250, more preferably up to 180, even more preferably up to 165 and most preferably up to 155.

The present invention further provides for the use of the above lacquer formulations, particularly for the coating of plastics and of natural and synthetic leathers, which are employed preferentially for the interior trim of automobiles. With particular preference they are employed as clearcoat material.

With the lacquer formulations of the present invention success has been achieved in producing lacquer formulations, comprising silicon dioxides, whose transparency is unaffected, or at least adversely affected only to a very small extent, by the silicon dioxides.

In addition to the outstanding transparency values the lacquer formulations of the present invention are distinguished by:

good suspension behavior,
high matting efficiency, and
good film-surface scratch resistance.

They are therefore outstandingly suitable for coating plastics used for the interior trim of automobiles.

A further surprising feature of the lacquer formulations of the present invention is the excellent soft-feel effect. In other words, surfaces which have been coated with the coating materials of the present invention have a pleasantly soft and natural feel. As a result of this quality the lacquer formulations of the present invention, particularly in the context of applications in the field of the furnishing of homes or interior trims of automobiles, exhibit great advantages over known lacquer formulations.

The present invention is described in detail below, beginning with a definition of some important terms.

Lacquer formulations for the purposes of the present invention are lacquer formulations comprising at least one polymer component and/or one mixture of two or more physically or chemically crosslinking polymer components, at least one solvent and at least one surface-modified silicon dioxide. The lacquer formulations of the present invention are preferably 1-component, 2-component or UV lacquers, especially polyurethane lacquers, and very preferably are clearcoat materials and matted lacquer formulations.

A clearcoat material for the purposes of the present invention is a coating material which, when applied to a substrate, forms a transparent coating having protective, decorative or specifically technical properties. Within a lacquer system the clearcoat, as the topmost film, protects the underlying films against mechanical damage and effects of weathering. A clearcoat material contains no pigments.

Particularly in the case of clearcoat materials the transparency of the coating material, i.e., the visual impression of how clear and undistorted the surface of the material coated with the clearcoat material is perceptible through the coating material after it has dried, is a measure of the quality of the coating material. Where the clearcoat material is applied to a glossy black substrate the black number $M_y$ can be employed as a measure of the transparency of this coating material.

Coating materials having a soft-feel effect are distinguished by specific tactual properties of their surface. For instance, coating materials of this kind achieve a pleasant tactile sensation, a kind of rubber effect, when stroked with the hand.

Silicon dioxides for the purposes of the present invention are selected from the group consisting of precipitated silicas, pyrogenic silicas, silica gels, modified pyrogenic silicas, and mixtures of said silicon dioxides. If the surface of the silicon dioxides has been modified with at least one polymer they are referred to as surface-modified silicon dioxides. Modified pyrogenic silicas (silicas prepared from pyrogenic silicas) are silicas which can be prepared on the basis of pyrogenic silicas according to DE 24 14 478.

Surface modification means the chemical and/or physical attachment of organic components to the surface of the silicon dioxide particles. In other words, at least part of the surface of at least some of the silicon dioxide particles in the case of surface-modified silicon dioxides is occupied by the surface modifier.

In one embodiment, the lacquer formulations of the present invention comprise at least one surface-modified silicon dioxide with a fraction of 0.5%-15% by weight, preferably 1%-10% by weight, and combine a 60° reflectometer value of <3 with a black number $M_y$ of at least 140, preferably at least 142 and more preferably at least 144. The black number $M_y$ may be up to 250, preferably up to 200, more preferably up to 180, particular preferred up to 165 and very preferred up to 155. The amount of the surface modified silicon dioxide includes all values and subvalues therebetween, especially including 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, and 14.5% by weight. The lacquer formulations of the present invention may further comprise one or more of the following components:

5-99.5%, preferably 20-80%, in particular 35-70% by weight of a polymer component or of a mixture of two or more physically or chemically crosslinking polymer components (=binder and curing components) and/or 0-80%, preferably 20-70%, in particular 30-55% by weight of a low molecular mass component which acts as solvent, or of a mixture of such low molecular mass components.

The amount of polymer or mixture includes all values and subvalues therebetween, especially including 10, 15, 20, 25, 30, 35, 40, 45, 50, 55, 60, 65, 70, 75, 80, 85, 90, 95 and 99% by weight. The amount of the low molecular mass component or mixture includes all values and subvalues therebetween, especially including 5, 10, 15, 20, 25, 30, 35, 40, 45, 50, 55, 60, 65, 70 and 75% by weight.

Besides the aforementioned components the lacquer formulations of the present invention may additionally comprise auxiliaries and additives, such as for example plasticizers, stabilizers, phase mediators, pigments, surfactants, dryers, catalysts, initiators, photosensitizers, inhibitors, light stabilizers, and preservatives.

All of the abovementioned ranges of preference can be set independently of one another, ensuring that the particular properties of the lacquer formulations of the present invention are achieved through a combination of all of the aforementioned components. The surface-modified silicon dioxides used, in particular, have an influence on the properties of the lacquer formulations.

As binders the lacquer formulations of the present invention may comprise resins such as those described, for example, in "*Lackharze, Chemie, Eigenschaften and Anwendungen*", edited by D. Stoye and W. Freitag, Hanser Verlag, Munich, Vienna 1996. The content of said publication is hereby expressly incorporated by reference into the content of the description of the present invention. Examples that may be mentioned include the polymers and copolymers of (meth) acrylic acid and their esters—which if desired carry further functional groups—with further olefinically unsaturated components, such as styrene, for example; polyether polyols, polyester polyols, polycarbonate polyols, polyurethane polyols, and epoxy resins, and also any desired mixtures of these polymers, and also fatty-acid-modified "alkyd resins" prepared by polycondensation, as described in Ullmann, 3rd edition, volume 11, page 334 ff. The content of said publication is hereby expressly incorporated by reference into the content of the description of the present invention.

Preferred polymer components employed are organic compounds which carry hydroxyl groups, examples being polyacrylate, polyester, polycaprolactone, polyether, polycarbonate, and polyurethane polyols and hydroxy-functional epoxy resins and also any desired mixtures of these polymers. Particularly preferred polymeric organic compounds are aqueous or solvent-borne or solvent-free polyacrylate polyols and polyester polyols and also any desired mixtures thereof.

Suitable polyacrylate polyols are copolymers of monomers whose groups include hydroxyl groups with other olefinically unsaturated monomers, such as esters of (meth) acrylic acid, styrene, α-methylstyrene, vinyltoluene, vinyl esters, monoalkyl and dialkyl maleates and fumarates, α-olefins and further unsaturated oligomers and polymers and their mixtures.

Particularly suitable polyacrylate polyols have an average, weight-averaged molecular weight, as determinable by means of gel permeation chromatography (polystyrene standard), of from 2000 to 100 000 g/mol, preferably from 2500 to 50 000 g/mol and more preferably from 3100 to 40 000 g/mol, a glass transition temperature Tg of from −50° C. to 100° C., preferably from −40° C. to 90° C. and more preferably from −30° C. to 80° C., an acid number of <30 mg KOH/g, preferably <25 mg KOH/g, and a hydroxyl group content of from 0.5% to 14.0%, preferably 0.5%-10% and very preferably from 1.0% to 8.0% by weight, and may comprise a) 0% to 70%, preferably 5% to 70% by weight of at least one unsaturated aromatic monomer, such as styrene, methylstyrene or vinyltoluene, b) 0% to 70%, preferably 5% to 70% by weight of at least one (cyclo)aliphatic ester of acrylic and/or methacrylic acid having 1 to 18 carbon atoms in the (cyclo)acryl radical, c) 4% to 95%, preferably 10% to 60% by weight of at least one hydroxyalkyl ester of acrylic and/or methacrylic acid having 2 to 4 carbon atoms in the hydroxyalkyl radical and/or adducts of monoepoxides with acrylic and/or methacrylic acid, d) 0% to 10%, preferably 0.1% to 5% by weight of at least one monoolefinically unsaturated monocarboxylic or dicarboxylic acid having 3 to 7 carbon atoms and/or at least one maleic and/or fumaric monoester having 1 to 14 carbon atoms in the alcohol residue, and e) 0% to 30%, preferably 0% to 20% by weight of at least one copolymerizable, olefinically unsaturated (including polyolefinically unsaturated) monomeric and/or polymeric compound.

The weight average molecular weight of the polyacrylate polyols includes all values and subvalues therebetween, especially including 5000, 10000, 20000, 30000, 40000, 50000, 60000, 70000, 80000 and 90000 g/mol. The glass transition temperature includes all values and subvalues therebetween, especially including −40, −30, −20, −10, 0, 10, 20, 30, 40, 50, 60, 70, 80 and 90° C. The acid number includes all values and subvalues between 0 and <30 mg KOH/g, especially including 5, 10, 15, 20, 25 and 29 mg KOH/g. The hydroxyl group content includes all values and subvalues therebetween, especially including 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, and 13.5% by weight. The amount of component a) includes all values and subvalues therebetween, especially including 5, 10, 15, 20, 25, 30, 35, 35, 40, 45, 50, 55, 60 and 65% by weight. The amount of component b) includes all values and subvalues therebetween, especially including 5, 10, 15, 20, 25, 30, 35, 35, 40, 45, 50, 55, 60 and 65% by weight. The amount of component c) includes all values and subvalues therebetween, especially including 10, 20, 30, 40, 50, 60, 70, 80 and 90% by weight. The amount of component d) includes all values and subvalues therebetween, especially including 2, 4, 6 and 8% by weight. The amount of component e) includes all values and subvalues therebetween, especially including 5, 10, 15, 20 and 25% by weight.

The hydroxy-functional polyols described can be used in both one-component and two-component lacquer systems together with the curing agents customary in painting coatings technology. Examples of suitable curing agents for this purpose include plain polyisocyanates or polyisocyanates blocked with temporary blocking agents such as methyl ethyl ketoxime, caprolactam, malonates, triazole or 2,5-dimethylpyrazole, or (partially) etherified melamine-formaldehyde resins, as described for example in Lackharze, Chemie, Eigenschaften und Anwendungen, edited by D. Stoye, W. Freitag, Hanser Verlag, Munich, Vienna, 1996. The content of said publication is hereby expressly incorporated by reference into the content of the description of the present invention.

Preference is given to the application of aqueous or solvent-borne binders in two-component systems, together with polyisocyanates based on (obtained from) hexamethylene diisocyanate, isophorone diisocyanate, 4,4-diisocyanatodicyclohexylmethane, tetramethylene diisocyanate, 2-methylpentamethylene diisocyanate, 2,2,4- and 2,3,3-trimethylhexamethylene diisocyanate (THDI), 1,4-diisocyanatocyclohexane, 3-isocyanatomethyl-1-methyl-1-isocyanatocyclohexane (IMCI), α,α,α',α'-tetramethyl-m- or -p-xylylene diisocyanate (TMXDI), 1,4- and 1,3-xylylene diisocyanate (XDI), hexahydroxylylene diisocyanate (H6-XDI) and/or mixtures thereof and also, if desired, hydrophilicized variants thereof for aqueous binders, as described for example in DE 41 36 618. The content of DE 41 36 618 is hereby expressly incorporated by reference into the content of the present description.

Particular preference, however, is given to the polyisocyanates based on hexamethylene diisocyanate, isophorone diisocyanate and 4,4-diisocyanatodicyclohexylmethane.

These polyisocyanates are used as curing agents in high-grade polyurethane lacquers which exhibit outstanding chemical resistance and high mechanical resistance.

Solvents which may be present in the lacquer formulations of the present invention include for example aromatic, aliphatic, araliphatic or cycloaliphatic hydrocarbons, fully or partly halogenated aromatic, aliphatic, araliphatic or cycloaliphatic hydrocarbons, alcohols such as methanol, ethanol, isopropanol, butanol, benzyl alcohol and diacetone alcohol, esters such as ethyl acetate, propyl acetate and butyl acetate, ether esters such as methoxypropyl acetate or butyl glycol acetate, ketones such as acetone, methyl ethyl ketone, methyl isobutyl ketone or cyclohexane, strongly polar solvents such as dimethylformamide and water and mixtures thereof.

Where these solvents are employed as a dispersing medium for the lacquer formulations of the present invention they may have further substances added to them. Preference is given to substances which are also envisaged for the subsequent utility or which enhance deagglomeration or enhance the stability of the deagglomerated materials, examples being dispersing resins or dispersing additives.

Preference is given to the oligomeric or polymeric organic compounds, such as the above-recited binders and resins that are customary in lacquer and coatings technology.

Additionally the combination resins used in multicomponent systems, such as, for example, the amine resins and melamine resins which function as curing agents, polyisocyanates, and also the adducts—known as blocked polyisocyanates—of aromatic or aliphatic polyisocyanates with temporary blocking agents such as methyl ethyl ketoxime, caprolactam, malonates or triazole and 2,5-dimethylpyrazole, can be used proportionally in the dispersing medium. For procedures where water is used as a substantial constituent of the dispersing medium, suitable additives include, in particular, water-soluble or water-compatible compounds, such as partially or fully hydrolyzed polyvinyl acetates or hydrophilicized variants of the aforementioned classes of compound, for example.

The additives and solvents which are suitable for preparing the dispersing medium can be blended with one another arbitrarily. The lacquer formulations of the present invention can be mixed with curing agents for producing coatings.

As a further constituent the lacquer formulations of the present invention comprise special surface-modified silicon dioxides. These silicon dioxides are precipitated silicas, pyrogenic silicas, silica gels or silicas prepared from pyrogenic silicas, whose surface has been modified with polymers. The choice of suitable surface-modified silica has a critical influence on the properties of the lacquer formulation.

The lacquer formulations of the present invention preferably comprise at least one silicon dioxide whose surface has been modified with at least one thermoplastic elastomer and/or one polyorganosiloxane and/or modified polyorganosiloxane. For the surface modification of the silicon dioxide it is possible to use thermoplastic elastomers in the form of aqueous and/or solvent-borne dispersions.

In one preferred embodiment, the lacquer formulations of the present invention comprise at least one silicon dioxide whose surface has been modified with at least one polysiloxane and/or modified polysiloxane, particular preference being given to surface-modified silicon dioxides as described in DE 10 2004 012 090 or to polysiloxanes and/or modified polysiloxanes as described in DE 36 27 782. The content of said patent applications/patents is hereby expressly incorporated by reference into the content of the present description.

In a further preferred embodiment, the lacquer formulations of the present invention comprise at least one surface-modified silicon dioxide whose surface has been modified with a thermoplastic elastomer, thermoplastic elastomers used being dimethylpolysiloxane elastomers having terminal epoxy groups, in particular having a molecular weight of more than 100 000.

In another preferred embodiment, the lacquer formulations of the present invention comprise at least one silicon dioxide whose surface has been modified with at least one thermoplastic elastomer, the thermoplastic elastomer used being preparable by:

(I) mixing
  (A) a rheologically stable polyamide resin which has a melting point or glass transition temperature of from 25° C. to 275° C.; this includes all values and subvalues therebetween, especially including 30, 40, 50, 60, 70, 80, 90, 100, 110, 120, 130, 140, 150, 160, 170, 180, 190, 200, 210, 220, 230, 240, 250, 260 and 270° C., (B) a silicone base which comprises:
(B') 100 parts by mass of a diorganopolysiloxane rubber which has a plasticity of at least 30, preferably at least 40 and most preferably at least 50 and has on average at least 2 alkenyl groups in its molecule,
(B") from 5 to 200 parts by mass of a reinforcing filler, this includes all values and subvalues therebetween, especially including 10, 20, 30, 40, 50, 60, 70, 80, 90, 100, 110, 120, 130, 140, 150, 160, 170, 180, and 190 parts by mass; the mass ratio between the silicone base and the polyamide resin being greater than 35:65 to 85:15, this includes all values and subvalues therebetween, especially including 40:60; 45:55; 50:50; 55:45; 60:40; 65:35; 70:30; 75:25 and 80:20,
(C) for each 100 parts by mass of the polyamide resin a compatibilizer which is selected from:
  (i) from 0.1 to 5 parts by mass of an adhesion promoter which has a molecular weight below 800 and contains at least two groups in its molecule that are selected independently from ethylenically unsaturated groups, epoxy, anhydride, silanol, carboxyl, oxazoline and alkoxy having 1 to 20 carbon atoms, the amount of i) includes all values and subvalues therebetween, especially including 0.2, 0.4, 0.6, 0.8, 1, 1.2, 1.4, 1.6, 1.8, 2, 2.2, 2.4, 2.6, 2.8, 3, 3.2, 3.4, 3.6, 3.8, 4, 4.2, 4.4, 4.6 and 4.8 parts by mass,
  (ii) from 0.1 to 10 parts by mass of a functional diorganopolysiloxane which contains in its molecule at least one group which is selected from epoxy, anhydride, silanol, carboxyl, amine, oxazoline and alkoxy having 1 to 20 carbon atoms, the amount of ii) includes all values and subvalues therebetween, especially including 0.5, 1, 1.5, 2, 2.5, 3, 3.5, 4, 4.5, 5, 5.5, 6, 6.5, 7, 7.5, 8, 8.5, 9 and 9.5 parts by mass, and
  (iii) from 0.1 to 10 parts by mass of a copolymer which includes at least one diorganopolysiloxane block and at least one block which is selected from polyamide, polyether, polyurethane, polyurea, polycarbonate and polyacrylate, the amount of iii) includes all values and subvalues therebetween, especially including 0.5, 1, 1.5, 2, 2.5, 3, 3.5, 4, 4.5, 5, 5.5, 6, 6.5, 7, 7.5, 8, 8.5, 9 and 9.5 parts by mass;
(D) an organohydrido-silicon compound which contains on average at least two silicon-bonded hydrogen groups in its molecule; and
(E) a hydrosilylation catalyst, components (D) and (E) being present in an amount sufficient to vulcanize the diorganopolysiloxane (B'); and where (II) the diorganopolysiloxane (B') is dynamically vulcanized.

The present invention further provides a thermoplastic elastomer which is prepared by the above process.

With very particular preference the lacquer formulations of the present invention comprise at least one surface-modified silicon dioxide whose surface has been modified with a thermoplastic polymer which has been prepared by the above-described process, components (A) to (E) being defined as follows:

Component (A):

Component (A) is a thermoplastic polyamide resin and a mixture of such resins. These resins, which are known under the general term "nylon", are long-chain synthetic polymers which contain amide bonds (i.e. —C(O)—NH—) along the main polymer chain. For the purposes of the present invention the polyamide resin has a melting point (m.p.) or, if the polyamide is amorphous, a glass transition temperature (Tg) between room temperature (i.e., 25° C.) and 275° C. The glass transition temperature includes all values and subvalues therebetween, especially including 30, 40, 50, 60, 70, 80, 90, 100, 110, 120, 130, 140, 150, 160, 170, 180, 190, 200, 210, 220, 230, 240, 250, 260 and 270° C. In experiments on the preparation of TPSiV (thermoplastic silicone vulcanizate) elastomers from polyamides having relatively high melting points (e.g., nylon 4/6) the resulting physical properties were poor, with the breaking elongation of such products lying below the 25% required according to the present invention. Additionally, for the purposes of the present invention, the polyamide resin is preferably dried by conducting a dry inert gas at elevated temperatures over resin beads or resin powder. The degree of drying which can be unified with acceptable properties and processing depends on the specific polyamide, and its respective value is recommended by the manufacturer or can be determined by means of a few simple tests. Generally speaking it is preferred for the polyamide resin to have a moisture content of not more than about 0.1 percent by mass. Finally, the polyamide must also be rheologically stable, as described below, under the mixing conditions which are necessary for the preparation of the TPSiV elastomer. This stability is evaluated on the resin as it is at a suitable processing temperature; if there is a change in the melt viscosity (torque during mixing) by more than 20% within the time normally required for preparing the corresponding TPSiVs (e.g., from 10 to 30 minutes in a container mixer), this points to the fact that the resin does not lie within the scope of the present invention. Accordingly, for example, a dried nylon 11 sample whose melting point is 198° C. was mixed for approximately 15 minutes in a container mixer under a nitrogen gas blanket at 210 to 220° C., the observed torque during mixing showing an increase by about 200%. Such a polyamide resin is not a suitable candidate for the present process.

In contrast to the above restrictions, the resin (A) may be any thermoplastic crystalline or amorphous, solid homopolymer, copolymer or terpolymer of high molecular weight which has repeating amide units in the polymer chain.

In the case of copolymer and terpolymer systems, more than 50 mol percent of the repeating units are units containing amide. Examples of suitable polyamides are polylactams, such as nylon 6, polyenantholactam (nylon 7), polycaprolactam (nylon 8), polylauryllactam (nylon 12) and the like; amino acid homopolymers such as polypyrrolidinone (nylon 4); copolyamides of dicarboxylic acid and diamine, such as nylon 6/6, polyhexamethyleneazelamide (nylon 6/9), polyhexamethylenesebacamide (nylon 6/10), polyhexamethyleneisophthalamide (nylon 6,I), polyhexamethylenedodecanoic acid (nylon 6/12) and the like; aromatic and partly aromatic polyamides; copolyamides such as copolymers of caprolactam and hexamethyleneadipamide (nylon 6,6/6), or a terpolyamide (e.g. nylon 6,6/6,6); block copolymers such as polyether-polyamides; or mixtures thereof. Preferred polyamide resins are nylon 6, nylon 12, nylon 6/12 and nylon 6/6.

Silicone Base (B):

The silicone base (B) is a uniform mixture of diorganopolysiloxane rubber (B') and a reinforcing filler (B").

Diorganopolysiloxane (B') is a high-consistency (rubber) polymer or copolymer containing in its molecule at least two alkenyl groups having 2 to 20 carbon atoms or mixtures of mol polymers or copolymers. Examples of the alkenyl group are, in particular, vinyl, allyl, butenyl, pentenyl, hexenyl and decenyl. The position of the alkenyl functionality is not critical and may be at the ends of the molecule chains, at nonterminal positions of the molecule chain or in both positions. It is preferred for the alkenyl group to be vinyl or hexenyl or a mixture thereof and to be present with a fraction of from 0.001 to 3, preferably from 0.01 to 1, percent by mass in the diorganopolysiloxane rubber. The amount of alkenyl group includes all values and subvalues therebetween, especially including 0.005; 0.01; 0.05; 0.1, 0.5, 1, 1.5, 2 and 2.5 percent by mass.

The other (i.e., non-alkenyl) organic groups attached to silicon in component (B') are selected independently from hydrocarbon and halogenated hydrocarbon groups which contain no aliphatic unsaturation. Mixtures may be used. Particular examples that may be mentioned of these groups include the following: alkyl groups having 1 to 20 carbon atoms, such as methyl, ethyl, propyl, butyl, pentyl and hexyl; cycloalkyl groups such as cyclohexyl and cycloheptyl; aryl groups having 6 to 12 carbon atoms, such as phenyl, tolyl and xylyl; aralkyl groups having 7 to 20 carbon atoms, such as benzyl and phenethyl; and haloalkyl groups having 1 to 20 carbon atoms, such as 3,3,3-trifluoropropyl and chloromethyl.

It will be understood, of course, that these groups are selected such that the diorganopolysiloxane rubber (B') possesses a glass transition temperature (or melting point) which is below room temperature and hence such that the rubber is elastomeric. Methyl accounts for preferably at least 50, more preferably at least 90, mol percent of the non-unsaturated organic groups attached to silicon in component (B').

The polydiorganosiloxane (13') may therefore be a homopolymer or a copolymer which contains such organic groups. Mixtures may be used. Examples are rubbers which include, inter alia: dimethylsiloxy units and phenylmethylsiloxy units; dimethylsiloxy units and diphenylsiloxy units; and dimethylsiloxy units, diphenylsiloxy units and phenylmethylsiloxy units. The molecular structure is also not critical; examples of this molecular structure include straight-chain and partially branched straight-chain structures, preference being given to linear structures.

Specific examples of the organopolysiloxane (B') include: dimethylsiloxane-methylhexenylsiloxane copolymers with trimethylsiloxy end blocks; dimethylsiloxane-methylhexenylsiloxane copolymers with dimethylhexenylsiloxy end blocks; dimethylsiloxane-methylvinylsiloxane copolymers with trimethylsiloxy end blocks; methylphenylsiloxane-dimethylsiloxane-methylvinylsiloxane copolymers with trimethylsiloxy end blocks; dimethylpolysiloxanes with dimethylvinylsiloxy end blocks; dimethylsiloxane-methylvinylsiloxane copolymers with dimethylvinylsiloxy end blocks; methylphenyl-polysiloxanes with dimethylvinylsiloxy end blocks; methylphenylsiloxane-dimethylsiloxane-methylvinylsiloxane copolymers with dimethylvinylsiloxy end blocks; and similar copolymers, at least one terminal group being dimethylhydroxysiloxy. The preferred systems for low-temperature applications include methylphenylsiloxane-dimethylsiloxane-methylvinylsiloxane copolymers and diphenylsiloxane-dimethylsiloxane-methylvinylsiloxane copolymers, the molar amount of dimethylsiloxane units being, in particular, approximately 93%.

Component (B') may also be composed of combinations of two or more organopolysiloxanes. Most preferably component (B') is a polydimethylsiloxane homopolymer which is terminated at each end of its molecule by a vinyl group, or a homopolymer of this kind which also contains at least one vinyl group along its main chain.

The molecular weight of the diorganopolysiloxane rubber is sufficient for the purposes of the present invention to achieve a Williams plasticity number of at least approximately 30 according to test method 926 of the American Society for Testing and Materials (ASTM). The plasticity number used here is defined as the thickness, in millimeters times one hundred, for a cylindrical test specimen with a volume of 2 cm$^3$ and a height of approximately 10 mm, after it has been subjected to a compression load of 49 newtons at 25° C. for three minutes.

If the plasticity of this component is below approximately 30, as in the case of the low-viscosity liquid siloxanes used by Arkles (U.S. Pat. No. 4,714,739), the TPSiVs prepared by dynamic vulcanization in accordance with the present process display a poor uniformity, so that at high silicone contents (e.g., 50 to 70 percent by mass) regions comprising essentially only silicone and regions comprising essentially only thermoplastic resin occur and the mixtures are weak and crumbly. The rubbers of the present invention are considerably more viscous than the silicone fluids used in the conventionally. By way of example the silicones considered by Arkles (see above) have an upper viscosity limit of 100 000 cS (0.1 m$^2$/s) and, although the plasticity of such low-viscosity liquids is difficult to measure by the ASTM-D-926 method, it has been found that this corresponds to a plasticity of approximately 24. Although there is no absolute upper limit for the plasticity of component (B'), this value is generally restricted as a result of practical considerations relating to the possibility of processing in conventional mixing equipment. The plasticity number should therefore be approximately 100 to 200, most preferably approximately 120 to 185. The plasticity number includes all values and subvalues therebetween, especially including 110, 120, 130, 140, 150, 160, 170, 180, and 190.

Processes for preparing high-consistency polydiorganosiloxanes containing unsaturated groups are well known and there is no need to discuss them in detail in this description. A typical process for preparing an alkenyl-functional polymer comprises, for example, the base-catalyzed equilibration of cyclic and/or linear diorganopolysiloxanes in the presence of similar alkenyl-functional species.

Component (B") is a finely divided filler which is known as a reinforcing agent of diorganopolysiloxane (B') and is preferably selected from finely divided heat-resistant minerals such as, for example, pyrogenic and precipitated forms of silicas, silica aerogels and titanium dioxide having a specific surface area of at least 50 m$^2$/g. Mixtures of fillers may be used. The pyrogenic form of silica is a preferred reinforcing filler on account of its high surface area, which can be up to 450 m$^2$/g; particular preference is given to a pyrogenic silica which has a surface area of from 50 to 400 m$^2$/g and greatest preference to a surface area of from 200 to 380 m$^2$/g. The surface area of the pyrogenic silica includes all values and subvalues therebetween, especially including 100, 150, 200, 250, 300 and 350 m$^2$/g. The filler of pyrogenic silica is preferably treated to give it a hydrophobic surface, such as is normally performed in silicone rubber technology. This can be achieved by reacting the silica with a liquid organosilicon compound which contains silanol groups or hydrolyzable precursors of silanol groups. The compounds which can be used as agents to treat the filler and which are referred to in silicone rubber technology as creep strength agents or plasticizers include ingredients such as liquid hydroxy- or alkoxy-terminated polydiorganosiloxanes, hexaorganodisiloxanes, cyclodimethylsilazanes and hexaorganodisilazanes of low molecular weight. The treatment compound is preferably an oligomeric hydroxy-terminated diorganopolysiloxane having an average degree of polymerization (DP) of from 2 to about 100, more preferably from about 2 to about 10, which is used at approximately 5 to 50 parts by mass for each 100 parts by mass of the silica filler. The degree of polymerization includes all values and subvalues therebetween, especially including 5, 10, 15, 20, 25, 30, 35, 40, 45, 50, 55, 60, 65, 70

75, 80, 85, 90 and 95. The amount of the treatment compound includes all values and subvalues therebetween, especially including 10, 15, 20, 25, 30, 35, 40 and 45 parts by mass. If component (B') is the preferred vinyl-functional or hexenyl-functional polydimethylsiloxane then this treatment agent is preferably hydroxy-terminated polydimethylsiloxane.

For the purposes of the present invention from 5 to 200, preferably from 5 to 150 and most preferably from 20 to 100 parts by mass of the reinforcing filler (B") are mixed uniformly with 100 parts by mass of the rubber (B') in order to prepare the silicone base (B). The amount of (B") includes all values and subvalues therebetween, especially including 25, 30, 35, 40, 45, 50, 55, 60, 65, 70 75, 80, 85, 90 and 95 parts by mass. This mixing is carried out by a method which is well known in silicone rubber technology, generally at room temperature, using a double-roll mill, an internal mixer or other suitable apparatus. Alternatively, the silicone base can be formed in situ during the mixing prior to dynamic vulcanization of the rubber, as described in more detail below. In the latter case, the mixing temperature is held below the softening point or melting point of the polyamide resin, until the reinforcing filler is well dispersed in the diorganopolysiloxane rubber.

Compatibilizer (C):

The compatibilizer (C) can be an adhesion promoter, an organofunctional diorganopolysiloxane or a siloxane copolymer or mixtures thereof. For the purposes of the present invention, at least one compatibilizer is used in preparing the thermoplastic elastomer.

In one embodiment, the compatibilizer (i) is an adhesion promoter having a molecular weight below 800 and containing in its molecule at least two groups which are selected independently from ethylenically unsaturated groups (e.g., vinyl, allyl, butenyl, pentenyl, hexenyl, acrylate and methacrylate), epoxy, anhydride, silanol, hydroxyl, alkoxy having 1 to 20, preferably 1 to 10, more preferably 1 to 4 carbon atoms, carboxyl and oxazoline. The latter group has the structure of the formula (i)

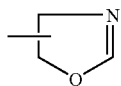

(i)

in which the carbon atoms of the ring may contain one or more substituents which are selected from hydrocarbon groups having 1 to 4 carbon atoms. The adhesion promoter may have an organic or siloxane-based skeleton structure providing it contains at least two of the above groups, which are arranged at the end positions, along the main chain, or both. In the case of siloxane main chains, the above functional organic groups (i.e., non-silanol groups) are attached via Si—C bonds to the silicon atoms (e.g., through a divalent hydrocarbon group such as trimethylene, tetramethylene or dimethylene) or to a divalent organic group which contains oxygen and/or nitrogen heteroatoms, such as ester, ether or amide, for example. Although the groups can be the same, it is preferred for at least one of them to be an ethylenically unsaturated group, preferably vinyl, while at least one other group is selected form the abovementioned epoxy, anhydride, alkoxy, silanol, hydroxyl, carboxyl and oxazoline groups.

Examples of suitable adhesion promoters include the following: allyl glycidyl ether, glycidyl methacrylate, 1,2-epoxy-7-octene, 1,2-epoxy-9-decene, 1,2-epoxy-5-hexene, allylsuccinic anhydride, vinyloxazolines, vinyloxazoline derivates such as 2-isopropenyl-2-oxazoline, gamma-glycidyloxypropylmethyldimethoxysilane, gamma-glycidyloxypropyltrimethoxysilane, beta-(3,4-epoxycyclohexyl)ethyltrimethoxysilane, 1,3-phenylene-bis(2-oxazoline), poly(propylene glycol) diglycidyl ether, diglycidyl ether of bisphenol A, tris(2,3-epoxypropyl) isocyanurate, and unsaturated diamides such as $CH_2=CH-(CH_2)_8-CO-NH-(CH_2)_6-NH-CO-(CH_2)_8-CH=CH_2$.

The concentration of these adhesion promoters can be from 0.1 to 5 parts and preferably from 0.2 to 3 parts by mass for each 100 parts by mass of the polyamide (A). The amount of adhesion promoter includes all values and subvalues therebetween, especially including 0.5, 1, 1.5, 2, 2.5, 3, 3.5, 4 and 4.5 parts by mass.

In another embodiment the compatibilizer (ii) is a functional diorganopolysiloxane having a number-average molecular weight of at least 800 g/mol, preferably from 800 to 50000, more preferably from 800 to 15000. The number average molecular weight includes all values and subvalues therebetween, especially including 900, 1000, 5000, 10000, 15000, 20000, 25000, 30000, 35000, 40000 and 45000. The functional diorganopolysiloxane (ii) is a polymer or copolymer in which the organic groups are independently selected from hydrocarbon groups or halogenated hydrocarbon groups containing no aliphatic unsaturation, as described above for component (B'), including preferred embodiments thereof This polymer or copolymer, however, must include at least one functional group which is selected as described above from epoxy, anhydride, silanol, alkoxy having 1 to 20, preferably 1 to 10, more preferably 1 to 4 carbon atoms, amine, carboxyl and oxazoline.

Examples of a suitable component (ii) include the following: epoxy-functional polydimethylsiloxanes such as mono (2,3-epoxypropyl) ether-terminated polydimethylsiloxane, epoxypropoxypropyl-terminated polydimethylsiloxane, (epoxycyclohexylethyl)methylsiloxane-dimethylsiloxane copolymers and (epoxypropoxypropyl)methylsiloxane-dimethylsiloxane copolymers; amine-functional polydimethylsiloxanes such as aminopropyl-terminated polydimethylsiloxane, aminoethylaminopropyl-terminated polydimethylsiloxane, aminopropyl-grafted polydimethylsiloxane, aminoethylaminopropyl-grafted polydimethylsiloxane; polydimethylsiloxanes which contain anhydride groups, such as succinic anhydride-terminated polydimethylsiloxane and succinic anhydride-grafted polydimethylsiloxane; silanol-terminated polydimethylsiloxanes; polydimethylsiloxanes which contain carboxyl groups, such as (mono)carboxydecyl-terminated polydimethylsiloxane and carboxydecyl-terminated polydimethylsiloxane; and polydimethylsiloxanes which contain oxazoline groups, such as vinyloxazoline-grafted polydimethylsiloxane.

The concentration of the functional diorganopolysiloxane can be from 0.5 to 10 parts and preferably from 0.5 to 5 parts by mass for each 100 parts by mass of the polyamide (A). The concentration of the functional diorganopolysiloxane includes all values and subvalues therebetween, especially including 1, 1.5, 2, 2.5, 3, 3.5, 4, 4.5, 5, 5.5, 6, 6.5, 7, 7.5, 8, 8.5, 9 and 9.5 parts by mass.

In the case of the compatibilizers (i) and (ii), it is sometimes preferred for the compatibilizer to be mixed with the polyamide resin at a temperature above the resin's melting point, before the silicone base is added. Although no attempt is made to pin down any one theory or mechanism, it is assumed that this method leads to a reaction between the functional groups of the compatibilizer and either the amide groups or the end groups of the resin, thereby maximizing the compatibilization effect. Alternatively it is sometimes of advantage to add the compatibilizer to a mixture of the polyamide and the silicone base. In any case the preferred method can be determined simply by means of routine tests.

In a further embodiment, the compatibilizer (iii) is a block copolymer or graft copolymer which comprises at least one diorganopolysiloxane block and at least one block selected from polyamide, polyether, polyurethane, polyurea, polycarbonate and polyacrylate. The copolymer (iii) may, for example, have an AB, (AB)$_n$, ABA, BAB, A-g-B or B-g-A structure, where n is an integer having a value of more than 1, g stands for graft, A is a diorganopolysiloxane block and B represents one of the abovementioned organic blocks. The diorganopolysiloxane block is a polymer or copolymer in which all of the organic groups independently are selected from hydrocarbon or halogenated hydrocarbon groups containing no aliphatic unsaturation, these groups having already been described in connection with component (B'). Accordingly this component may be selected for example from the following: diorganopolysiloxane-polyether block or graft copolymers, diorganopolysiloxane-polyamide block or graft copolymers, diorganopolysiloxane-polyurethane block or graft copolymers, diorganopolysiloxane-polyurea block or graft copolymers, diorganopolysiloxane-polycarbonate block or graft copolymers, diorganopolysiloxane-polyacrylate block or graft copolymers or diorganopolysiloxane-polymethacrylate block or graft copolymers, the diorganopolysiloxane preferably being a polydimethylsiloxane block. It is preferred for the number-average molecular weight of the copolymer (iii) to be from 1500 to 50 000 g/mol, more preferably from 2000 to 20 000. The numbers—average molecular weight of copolymer (iii) includes all values and subvalues therebetween, especially including 2000, 5000, 10000, 15000, 20000, 25000, 30000, 40000, and 45000.

Examples of a copolymer (iii) include the following: polyamide-polydimethylsiloxane copolymers such as the siloxane-based polyamides prepared by reacting an SiH-functional dimethylsiloxane with a reaction product of an olefinic acid and a diamine (as described in U.S. Pat. No. 5,981,680 to Petroff et al.); copolymers prepared by reacting $\alpha,\omega$-bis(aminoalkyl)polydimethylsiloxane with hydroxy-terminated polyamide prepolymer having a molecular weight of from 1500 to 3000; copolymers prepared by reacting $\alpha,\omega$-bis (aminoalkyl)-functional polydimethylsiloxane with aromatic, aliphatic or cycloaliphatic diisocyanates having an average molecular weight of, for example, from 1500 to 3000; and copolymers of poly(alkylene oxide) and polydimethylsiloxane such as poly(ethylene oxide)-poly-dimethylsiloxane-poly(ethylene oxide) block copolymers and poly(propylene oxide)-poly-dimethylsiloxane-poly(propylene oxide) block copolymers, and also graft copolymers of such systems. Mixtures can be used.

The concentration of these copolymers can be 0.5 to 10 parts, preferably from 0.5 to 5 parts, by mass for each 100 parts by mass of the polyamide (A). The concentration of copolymer (iii) includes all values and subvalues therebetween, especially including 1, 1.5, 2, 2.5, 3, 3.5, 4, 4.5, 5, 5.5, 6, 6.5, 7, 7.5, 8, 8.5, 9 and 9.5 parts by mass.

Organohydrido-Silicon Compound (D):

The organohydrido-silicon compound (D) is at least one crosslinker (vulcanizing agent) for the diorganopolysiloxane (B') of the present composition and is an organopolysiloxane which contains at least 2 silicon-bonded hydrogen atoms in each molecule but contains at least about 0.1 percent by mass of hydrogen, preferably from 0.2 to 2 percent and most preferably from 0.5 to 1.7 percent of silicon-bonded hydrogen. The amount of silicon-bonded hydrogen includes all values and subvalues therebetween, especially including 0.4, 0.6, 0.8, 1, 1.2, 1.4, 1.6 and 1.8%. It is of course self-evident to the skilled worker that either component (B') or component (D), or both, must possess a functionality of more than 2 if the diorganopolysiloxane (B') is to be vulcanized (in other words the sum of these functionalities must on average be greater than 4). The position of the silicon-bonded hydrogen in component (D) is not critical; it may be at the ends of the molecule's chains, at nonterminal positions along the molecule's chain, or in both positions. The silicon-bonded organic groups of component (D) are selected independently from one of the (non-alkenyl) hydrocarbon or halogenated hydrocarbon groups described above in connection with the diorganopolysiloxane (B'), including preferred embodiments thereof. The molecular structure of component (D) is likewise not critical; as examples mention may be straight-chain, partially branched straight-chain, cyclic and partially branched or unbranched net structures, preference being given to linear polymers or copolymer. This component ought to be compatible with the diorganopolysiloxane (B') (in other words, it is active during the vulcanization of component (B')).

Examples of Component (D) Include the Following:

Siloxanes of low molecular weight such as PhSi (OSiMe$_2$H)$_3$; methylhydridopolysiloxanes having trimethylsiloxy end blocks; dimethylsiloxane-methylhydridosiloxane copolymers having trimethylsiloxy end blocks; dimethylpolysiloxanes having dimethylhydridosiloxy end blocks; methylhydropolysiloxanes having dimethyihydrosiloxy end blocks; dimethylsiloxane-methylhydridosiloxane copolymers having dimethylhydridosiloxy end blocks; cyclic methylhydropolysiloxanes; cyclic dimethylsiloxane-methylhydridosiloxane copolymers; tetrakis(dimethylhydrosiloxy) silane; silicone resins composed of the units $(CH_3)_2HSiO_{1/2}$, $(CH_3)_3SiO_{1/2}$ and $SiO_{4/2}$; and silicone resins composed of the units $(CH_3)_2HSiO_{1/2}$, $(CH_3)_3SiO_{1/2}$, $CH_3SiO_{3/2}$, $PhSiO_{3/2}$ and $SiO_{4/2}$, Me and Ph below identifying methyl and phenyl groups respectively.

Particularly preferred organohydrido-silicon compounds are polymers or copolymers which include RHSiO units with the ends $R_3SiO_1$/or $HR_2SiO_{1/2}$, R being selected independently from alkyl groups having 1 to 20 carbon atoms, phenyl and trifluoropropyl, preferably methyl. It is also preferred for the viscosity of component (D) to be approximately 0.5 to 1000 mPa*s at 25° C., preferably from 2 to 500 mPa*s. The viscosity of component (1) includes all values and subvalues therebetween, especially including 1, 5, 10, 50, 100, 200, 300, 400, 500, 600, 700, 800 and 900 mPa*s. Additionally this component contains preferably from 0.5 to 1.7 percent by mass of silicon-bonded hydrogen. It is especially preferred for component (D) to be selected from a polymer which comprises methylhydridosiloxane units or from a copolymer which comprises dimethylsiloxane units and methylhydridosiloxane units, to contain from 0.5 to 1.7 percent of silicon-bonded hydrogen, and to have a viscosity of from 2 to 500 Pa*s at 25° C. The amount of silicon-bonded hydrogen includes all values and subvalues therebetween, especially including 0.6, 0.7, 0.8, 0.9, 1, 1.1, 1.2, 1.3, 1.4, 1.5, and 1.6% by mass. The viscosity includes all values and subvalues therebetween, especially including 5, 10, 50, 100, 150, 200, 250, 300, 350, 400 and 450 mPa*s at 25° C. It will be understood that a particularly preferred system of this kind has terminal groups which are selected from trimethylsiloxy groups and dimethylhydridosiloxy groups.

Component (D) may also be a combination of two or more of the above systems. The organohydrido-silicon compound (D) is used in an amount such that the molar ratio between the SiH it contains and the Si-alkenyl in component (B') is greater than 1, preferably below about 50, more preferably from 3 to 30 and most preferably from 4 to 20.

Hydrosilylation Catalyst (E):

These SiH-functional materials are in large part commercially available.

The hydrosilylation catalyst (E) is a catalyst which accelerates the vulcanization of the diorganopolysiloxane (B') in the present composition. Examples of this hydrosilylation catalyst that may be mentioned include the following: platinum catalysts such as platinum black, platinum supported on silica, platinum supported on carbon, chloroplatinic acid, alcohol solutions of chloroplatinic acid, platinum/olefin complexes, platinum/alkenyl siloxane complexes, platinum/beta-diketone complexes, platinum/phosphine complexes and the like; rhodium catalysts such as rhodium chloride, rhodium chloride/di-n-butyl sulfide complex and the like; and palladium catalysts such as palladium on carbon, palladium chloride and the like. Component (E) is preferably a platinum-based catalyst such as chloroplatinic acid; platinum dichloride; platinum tetrachloride; a platinum complex catalyst which is prepared by reacting chloroplatinic acid with divinyltetramethyldisiloxane, which has been diluted by polydimethylsiloxane containing dimethylvinylsiloxy end blocks, prepared according to U.S. Pat. No. 3,419,593 to Willing; and a neutralized complex of platinum dichloride and divinyltetramethyldisiloxane, prepared according to U.S. Pat. No. 5,175,325 to Brown et al. The most preferred catalyst (E) is a neutralized complex of platinum dichloride and divinyltetramethyldisiloxane.

Component (E) is added to the present composition in a catalytic amount sufficient to promote the reaction of components (B') and (D) and so to vulcanize the diorganopolysiloxane with the formulation of an elastomer. The catalyst is preferably added such that approximately 0.1 to 500 ppm, more preferably 0.25 to 100 ppm (parts per million parts), of the metal atoms are present relative to the total weight of the composition of the thermoplastic elastomer. The amount of catalyst includes all values and subvalues therebetween, especially including 0.5, 1, 5, 10, 50, 100, 150, 200, 250, 300, 350, 400, and 450 ppm.

In a preferred embodiment of the present invention, a hindered phenol (F) is included in the formulation. This optional component is an organic component containing in its molecule at least one group having the structure

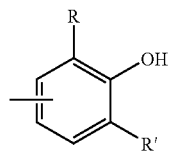

(ii)

In the above formula, R is an alkyl group having one to four carbon atoms and R' is a hydrocarbon group having four to eight carbon atoms. For the purposes of the present invention a group of the formula (ii) can be attached to the hydrogen, in order to form a 1,5-di-organophenol. Preferably from one to four of these groups are attached to an organic component of appropriate valence such that the compound under consideration has a molecular weight (MW) of below about 1500 g/mol. Most preferably four such groups are present in component (F), this compound having a molecular weight of below 1200. This monovalent (or polyvalent) organic component may include heteroatoms such as oxygen, nitrogen, phosphorus and sulfur. Examples that may be mentioned of the R' groups in the above formula include t-butyl, n-pentyl, butenyl, hexenyl, cyclopentyl, cyclohexyl and phenyl. Both, R and R', are preferably t-butyl.

The nonrestricting specific examples of component (F) include various hindered phenols which are marketed by Ciba Specialty Chemicals Corporation under the commercial designation Irganox™:

Irganox™ 1076=octadecyl 3,5-di-tert-butyl-4-hydroxyhydrocinnamate,

Irganox™ 1035=thiodiethylene-bis(3,5-di-tert-butyl-4-hydroxyhydrocinnamate),

Irganox™ MD 1024=1,2-bis(3,5-di-tert-butyl-4-hydroxyhydrocinnamoyl)hydrazine,

Irganox™ 1330=1,3,5-trimethyl-2,4,6-tris(3,5-di-tert-butyl-4-hydroxybenzyl)benzene, Irganox™ 1425 WL=calcium bis(monoethyl(3,5-di-tert-butyl-4-hydroxybenzyl)phosphonate), and Irganox™ 3114=1,3,5-tris-(3,5-di-tert-butyl-4-hydroxybenzyl)-1,3,5-triazine-2,4,6(1H,3H,5H)-trione.

Preferred hindered phenols are Irganox™ 245 {triethylene glycol bis(3-(3'-tert-butyl-4'-hydroxy-5'-methylphenyl)propionate)}, Irganox™ 1098 {N,N'-hexamethylene bis(3,5-di-tert-butyl-4-hydroxyhydrocinnamarnide)} and Irganox™ 1010 {tetrakis(methylene(3,5-di-tert-butyl-4-hydroxy-hydrocinnamate))methane}.

It is preferred to use from 0.1 to 5 parts by mass of the hindered phenol (F) for each 100 parts by mass of the polyamide (A) plus the silicone base (13). It is preferred to add from 0.1 to 0.75 part, more preferably from 0.475 to 0.525 part, by mass of (F) for each 100 parts by mass of (A) plus (B). The amount of (F) includes all values and subvalues therebetween, especially including 0.5, 1, 1.5, 2, 2.5, 3, 3.5, 4 and 4.5 parts by mass.

Additionally to the above components a small amount of an optional additive (G) can be included in the compositions of the present invention. This optional component is preferably added in an amount of from 0.5 to 40 percent, more preferably from 0.5 to 20 percent, by mass based on the total composition. The amount of (G) includes all values and subvalues therebetween, especially including 1, 5, 10, 15, 20, 25, 30 and 35% by mass. The following may be mentioned as nonrestricting examples of this optional additive: reinforcing fillers for polyamide resins, such as glass fibers and carbon fibers; inert fillers such as quartz, barium sulfate, calcium carbonate and diatomaceous earth; pigments such as iron oxide and titanium oxide; electrically conducting fillers such as carbon black and finely divided metals; heat-resistant stabilizers such as cerium oxide hydrates; antioxidants; flame retardants such as halogenated hydrocarbons, aluminum trihydroxide, magnesium hydroxide and organophosphorns compounds; and other flame retardant (FR) materials. One preferred FR additive is calcium silicate in solid form, preferably a wollastonite having an average particle size of from 2 to 30 μm. The particle size of the calcium silicate includes all values and subvalues therebetween, especially including 5, 10, 15, 20, and 25 μm. The optional component (G) may further be a plasticizer for the silicone rubber component—a polydimethylsiloxane oil by way of example—and/or a plasticizer for the polyamide component. Examples of the latter include phthalate esters such as dicyclohexyl phthalate, dimethyl phthalate, dioctyl phthalate, butyl benzyl phthalate and benzyl phthalate; trimellitate esters such as $C_1$-$C_9$ alkyl trimellitate; sulfonamides such as N-cyclohexyl-p-toluenesulfonamide, N-ethyl-o,p-toluenesulfonamide and o-toluenesulfonamide, and liquid oligomeric plasticizers. Preferred plasticizers are liquids of low volatility which minimize the emissions of plasticizer at the usual melting temperatures of polyamides.

The above additives are normally added after the dynamic vulcanization of the ultimate thermoplastic composition but may also be added at any point during the preparation, provided they do not disrupt the mechanism of dynamic vulcanization. The abovementioned additional ingredients are of course used only in amounts which do not substantially detract from the desired properties of the ultimate composition.

In accordance with the process of the present invention the thermoplastic elastomer used for coating the silicon dioxides used in the lacquer formulations of the present invention can be prepared by carefully dispersing the silicone base (B) and the compatibilizer (C) in the polyamide (A) and dynamically vulcanizing the diorganopolysiloxane in the base, using the organohydrido-silicon compound (D) and the catalyst (E). For the purposes of the present invention the mass ratio between the silicone base (B) and the polyamide resin (A) is rated from 35:65. It has been found that, if this ratio is 35:65 or less, the resulting vulcanizate generally has a modulus which is more similar to that of the polyamide resin than to that of the thermoplastic elastomer. On the other hand the above ratio ought not to be higher than about 85:15, since in that case the compositions tend to be weak, and are similar to vulcanized silicone elastomers above this figure. Irrespective of this upper limit, the maximum ratio of (B) to (A) for any given combination of components is also restricted by considerations regarding the processing properties, since an excessive amount of silicone base leads to an at least partially crosslinked coherent phase, which is no longer thermoplastic. This practical limit is easily determined for the purposes of the present invention by means of routine tests and represents the greatest amount of component (B) which can be compression molded with the TPSiV. It is preferred, however, for the ultimate thermoplastic elastomer to be able also to be easily processed in other common plastics operations such as, for example, injection molding and extrusion, and in that case the mass ratio of components (B) and (A) should not be higher than about 75:25. A preferred thermoplastic elastomer of this kind, which is reprocessed later on, often has a tensile strength and breaking elongation which are situated within 10% of the corresponding values of the original TPSiV (i.e., such that the thermoplastic elastomer is not changed very much by the reprocessing). Although the amount of silicone base which can be unified with the above process depends on the specific polyamide resin and on other selected components, the mass ratio between components (B) and (A) is 35:65 to 85:15, preferably from 40:60 to 75:25, more preferably from 40:60 to 70:30. The mass ratio between (B) and (A) includes all values and subvalues therebetween, especially including 40:60; 45:55; 50:50; 55:45; 60:40; 65:35; 70:30; 75:25 and 80:20.

The mixing operation is carried out in any apparatus which allows the components to be dispersed uniformly in the polyamide resin: for example, in an internal mixer or a twin-screw extruder, the latter being preferred for industrial preparations. The temperature is preferably kept as low as is practically possible for effective mixing, so as not to impair the resin. Depending on the specific system the sequence when mixing is normally not critical, so that, for example, components (A), (C), (D) and—optionally—(F) can be added to (B) at a temperature above the softening point of (A) (i.e., melting point or glass transition temperature), and then the catalyst (E) is introduced in order to start the dynamic vulcanization. Components (B) to (F) ought, however, to be well dispersed in the resin (A) before dynamic vulcanization begins. As already stated it is also understood that the silicone base can be formed in situ. The reinforcing filler, for example, can be introduced into a mixer which already contains the polyamide resin and the diorganopolysiloxane rubber, at a temperature below the softening point of the resin, in order for the filler to be dispersed thoroughly in the rubber. The temperature is then raised in order to melt the resin, the other ingredients are added, and the mixing/dynamic vulcanization is carried out. The optimum temperatures, mixing times and other conditions of the mixing operation depend on the specific resin and on the other components in question and can be determined by skilled personnel by means of routine tests. The mixing and dynamic vulcanization, however, are preferably carried out under a dry, inert atmosphere (i.e., an atmosphere which does not result in deleterious reactions with the components or otherwise disrupt the hydrosilylation/vulcanization) such as, for example, dry nitrogen, helium or argon.

As remarked above, the tensile strength or breaking elongation of the TPSiV elastomer, or both, must be at least 25% greater than those of a corresponding simple mixture in order to remain within the scope of the present invention. A further requirement of the present invention is that the TPSiV have a breaking elongation of at least 25%, as determined in the test described below. In this context the term "simple mixture" (or physical mixture) denotes a composition wherein the proportions by mass of resin (A), base (B) and compatibilizer (C) are identical with the proportions in the TPSiV but without the use of any vulcanizing agents (in other words, either component (D) or (E), or both, is or are omitted and the rubber, accordingly, is not vulcanized). In order to determine whether a specific composition meets the above criterion the tensile strength of the TPSiV is measured in accordance with ASTM method D 412, with an extension rate of 50 mm/min, on dumbbell specimens 25.4 mm long and 3.2 mm wide with a typical thickness of 1 to 2 mm. At least three of these specimens are evaluated and the results are averaged, disregarding the values which are obviously too low, caused by inhomogeneity in the specimens (e.g., voids, contamination or inclusions). These results are then compared with the corresponding averages for tensile strength and breaking elongation of a specimen produced from the composition of the simple mixture. If at least a 25% improvement in tensile strength and/or breaking elongation relative to the simple mixture is not achieved, no advantage can be derived from the dynamic vulcanization: TPSiVs of this kind are then outside the scope of the present invention. Details of the above-described thermoplastic elastomers and of the process for their preparation can be found in U.S. Pat. No. 6,362,288. The content of that patent is expressly incorporated by reference into the context of the present description.

The thermoplastic elastomer prepared with the process described above can be processed by customary methods such as extrusion, vacuum forming, injection molding, blow molding, multicomponent injection molding or compression molding. Additionally these compositions can be reprocessed (recycled) with little or no adverse effect on their mechanical properties.

With particular preference the lacquer formulations of the present invention comprise silicon dioxides whose surface has been coated with the thermoplastic elastomer Dow Corning 33 Additive (Dow Corning, Technical Data Sheet of Feb. 25, 2003).

The surface-modified silicon dioxides used in the lacquer formulations of the present invention may independently of one another exhibit one or more of the following physico-chemical parameters.

| | |
|---|---|
| Carbon content: | 0.5-30%, preferably 1-20%, in particular 2-10% by weight; |
| DBP (anhydrous): | 100-600 g/100 g, preferably 200-450 g/100 g, in particular 250-380 g/100 g; |
| Mean particle size $d_{50}$: | 0.5-50 μm, preferably 1-30 μm, in particular 2-20 μm; |
| pH: | <8, preferably <6 and more preferably <4. |

The carbon content includes all values and subvalues therebetween, especially including 1, 5, 10, 15, 20 and 25% by weight. The DBP (dibutylphthalate) number includes all values and subvalues therebetween, especially including 150, 200, 250, 300, 350, 400, 450, 500 and 550 g/100 g. The mean size particle includes all values and subvalues therebetween, especially including 1, 5, 10, 15, 20, 25, 30, 35, 40 and 45 μm. The pH includes all values and subvalues between 0 and 8, especially including 1, 2, 3, 4, 5, 6 and 7.

The above-described, surface-modified silicon dioxides which are present in the lacquer formulations of the present invention can be prepared by surface-treating commercially customary silicon dioxides, or silicon dioxides preparable by known processes, using the aforementioned polymers. This surface treatment may take place in accordance with methods which are known per se.

It is possible, for example, to mix commercially customary silicon dioxides, examples being matting agents from Grace (Syloid ED 2, Syloid ED 3, Syloid ED 5, Syloid C 805, Syloid C 807, Syloid C 809, Syloid C 812), from Ineos (HP 260, HP 270, HP 285, HP 39, HP 395), from Silysia (Sylysia 350, Sylysia 370, Sylysia 270) or from Degussa A G, with one of the aforementioned polymers and to carry out occupation at room temperature or elevated temperature.

Additionally it is possible to carry out the occupation of the silica with the elastomer during the preparation of the silica. Thus the elastomer can, for example, be added to the precipitation suspension of the silicon dioxide. It is, however, also possible to spray in the silicon dioxide together with the elastomer in a spray dryer and to carry out the surface modification in the course of drying. Finally, it is also possible to carry out the occupation of the silicon dioxide after drying—for example, during the grinding of the silica. As already stated, processes for modifying silicon dioxides are known to the skilled worker, or known processes can be easily be modified by the use of the corresponding elastomers. Accordingly the process versions recited above are not complete. It is possible to carry out the surface modification by further processes. Details of surface modification processes which can be employed correspondingly can be found in EP 1281733 A1. The content of that application is hereby expressly incorporated by reference into the subject matter of the description of the present application.

Particularly preferred surface-modified silicon dioxides are described in PCT/EP03/12380, in PCT/EP03/12381, and in the European patent application number EP 02 02 8310.7. The content of said patent applications is hereby expressly incorporated by reference into the content of the present invention.

The lacquer formulations of the present invention can be prepared by all of the methods known to the skilled worker.

The lacquer formulations of the present invention are employed preferably for the coating of plastics and of natural and synthetic leathers, particularly those used for the interior trim of automobiles. They are preferably employed in the form of clearcoat material.

Having generally described this present invention, a further understanding can be obtained by reference to certain specific examples which are provided herein for purposes of illustration only, and are not intended to be limiting unless otherwise specified.

EXAMPLES

Measurement Methods

The physicochemical data of the lacquer formulations of the invention and of the silicon dioxides employed in them were determined using the following methods:

Determination of Tapped Density

The tapped density was determined in a method based on DIN EN ISO 787-11.

A defined amount of a sample which has not been sieved beforehand was introduced into a graduated glass cylinder and subjected to a fixed number of jolts by means of a jolting volumeter. The jolting was accompanied by compaction of the sample. The result of the analysis conducted is the tapped density.

The measurements were carried out on a jolting volumeter with counter from Engelsmann, Ludwigshafen, Type STAV 2003.

First of all, a 250 ml glass cylinder was tared on a precision balance. Then 250 ml of the silicon dioxide were introduced with the aid of a powder funnel into the tared graduated cylinder in such a way that no cavities were formed. Subsequently, the sample quantity was weighed to an accuracy of 0.01 g. Thereafter, the cylinder was tapped lightly so that the surface of the powder in the cylinder was horizontal. The graduated cylinder was inserted into the corresponding holder on the jolting volumeter and jolted 1250 times. The volume of the jolted sample was read off to an accuracy of 1 ml after one jolting process.

The tapped density D(t) was calculated as follows:

$$D(t)=m*1000/V$$

D(t): tapped density [g/l],

V: volume of the silicon dioxide after jolting [ml], m: mass of the silicon dioxide [g].

Determination of Loss on Drying (LD)

The moisture content or loss on drying (LD) of silicon dioxides was determined by a method based on ISO 787-2 after 2-hour drying at 105° C. This loss on drying was accounted for predominantly by aqueous moisture.

10 g of the pulverulent silicon dioxide were weighed to an accuracy of 0.1 mg (initial mass E) into a dry glass beaker on a precision balance (Sartorius LC621 S). The glass beaker was covered with aluminum foil into which a number of holes (Ø 1 mm) have been drilled. The glass beaker covered in this way was dried in a drying oven at 105° C. for 2 h. Thereafter, the hot glass beaker was cooled to room temperature in a desiccator over dryers for at least one hour.

In order to determine the final mass A, the glass beaker was weighed to an accuracy of 0.1 mg on the precision balance. The moisture content (LD) in % was determined in accordance with $$TV=(1-A/E)*100,$$

where A=final mass in g and E=initial mass in g.

Determination of Loss on Ignition (LOI)

According to this method the weight loss of silicon dioxides was determined in a method based on DIN EN ISO 3262-1 at 1000° C. At this temperature physically and chemically bound water and other volatile constituents escape. The moisture content (LD) of the sample investigated was determined by the above-described method "Determination of loss on drying" based on DIN EN ISO 787-2.

0.5 g of the silica was weighed to an accuracy of 0.1 mg (initial mass E) into a tared porcelain crucible which has been purified beforehand. The sample was heated in a muffle furnace at 1000±50° C. for 2 h. The porcelain crucible was subsequently cooled to room temperature in a desiccator cabinet with silica gel as dryer. The final mass A was determined gravimetrically.

The loss on ignition LOI in % was obtained in accordance with $$LOI=(1-A/F)*100.$$

F is the corrected initial mass, based on dry matter, in g, and was calculated according to $$F=E*(1-LD/100).$$

In the calculations: A=final mass in g, E=initial mass in g, and LD=loss on drying in %.

Determination of Carbon Content (C %)

The carbon content of silicon dioxides was determined using the C-mat 500 (Strohlein Instruments). The samples were heat treated at about 1350° C. and the carbon was oxidized to $CO_2$ by a stream of oxygen. The $CO_2$ was measured in an infrared cell.

In the measurements a distinction was made as to whether the carbon content was greater than or less than 1 percent. If the carbon content of the homogeneous silica samples was above 1 percent, measurement was carried out in the "high" range of the instrument; if it was below 1 percent, measurement took place in the "low" range.

First of all, the control sample was measured. For that purpose 0.14-0.18 g of the control sample was weighed out on an analytical balance into a porcelain boat purified by calcining and cooled to room temperature. When the start button was operated the weight was carried over, since the balance was coupled with the C-mat. The boat must be pushed into the middle of the combustion tube within 30 seconds. When combustion was at an end the measurement was converted into pulses and was evaluated by the computer. At least 3 determinations (depending on agreement) were carried out. If appropriate it was necessary to readjust the factor of the instrument (for details see operating instructions C-mat 500, Strohlein Instruments). This factor was calculated according to the following formula:

$$\text{Factor} = \frac{\text{Setpoint (Standard)} * \text{Initial mass (Standard) in g} * 10^8}{\text{Pulses}}$$

Subsequently the silicon dioxides were measured. The initial mass was 0.04-0.05 g. The porcelain boat was covered with a porcelain lid. In the event of deviations>0.005% a greater number of measurements were carried out and the average was calculated.

The C-mat 500 was operated in accordance with the operating instructions from Strohlein Instruments.

The carbon content was calculated as follows and expressed in the unit %:

$$\text{Carbon content}=(1*F*10^{-8})/E$$

1=Pulse,

F=Factor,

E=Initial mass in g.

Determination of pH

The method, based on DIN EN ISO 787-9, was used for determining the pH of an aqueous suspension of silicon dioxides at 20° C.

Prior to the pH measurement, the pH meter (Knick, Type: 766 pH meter Calimatic with temperature sensor) and the pH electrode (Schott, N7680 combination electrode) must be calibrated, using the buffer solutions, at 20° C. The calibration function was to be chosen such that the two buffer solutions used include the expected pH of the sample (buffer solutions of pH 4.00 and 7.00, pH 7.00 and pH 9.00, and, if appropriate, pH 7.00 and 12.00).

5.00 g of the pulverulent silicon dioxide with a moisture content of 4±2% were weighed to an accuracy of 0.01 g on a precision balance into a wide-necked glass bottle which had been tared beforehand. The suspension was made up to the 100 ml mark using cold, deionized water at a temperature of 20° C. If the samples under investigation were not sufficiently wettable by water, then the suspension was made up to the 100 ml mark using 50.0 ml of analytical-grade methanol and 50.0 ml of deionized water.

Subsequently, the suspension was shaken in a sealed vessel for a period of 5 minutes using a shaker machine (Gerhardt, Model LS10, 55 W, level 7) at 20° C. The pH was measured directly thereafter. For the measurement, the electrode was rinsed first with deionized water and then with a portion of the suspension, and then was immersed into the suspension. A magnetic stirrer bar was then added to the suspension, and the pH measurement was carried out at constant stirring speed, with a slight vortex being formed in the suspension. When the pH meter displayed a constant value the pH was read off on the display.

Determination of DBP Absorption (DBP)

The DBP absorption (DBP number), which is a measure of the absorbency of silicon dioxides, was determined by a method based on standard DIN 53601, as follows:

12.50 g of the pulverulent silicon dioxide (moisture content 4±2%) were introduced into the kneader chamber (article number 279061) of the Brabender absorptometer "E" (without damping of the outlet filter of the torque sensor). With continuous mixing (kneader paddles rotating at a speed of 125 rpm) dibutyl phthalate was added dropwise to the mixture at a rate of 4 ml/min at room temperature by means of the Brabender T90/50 Dosimat. Its incorporation by mixing took place with only a small amount of force, and was monitored by means of the digital display. Toward the end of the determination the mixture became pasty, which was indicated by a sharp increase in the required force. At a display reading of 600 digits (torque of 0.6 Nm) an electrical contact shuts off both the kneader and the DBP feed. The synchronous motor for the DBP feed was coupled to a digital counter, so that the consumption of DBP in ml could be read off.

The DBP absorption was reported in g/100 g and was calculated using the following formula:

$$DBP = \frac{V*D*100}{E} * \frac{g}{100\ g} + K$$

where DBP=DBP absorption in g/100 g,

V=consumption of DBP in ml,

D=density of DBP in g/ml (1.047 g/ml at 20° C.),

E=initial mass of silicon dioxide in g,

K=correction value as per moisture correction table, in g/100 g.

The DBP absorption is defined for anhydrous, dried silicon dioxides (DBP (anhydrous)). When moist silicon dioxides were used it was necessary to take into account the correction value K for calculating the DBP absorption. This value can be determined using the moisture correction table; for example, silicon dioxide having a water content of 5.8% would mean an addition of 33 g/100 g for the DBP absorption. The moisture content of the silicon dioxides was determined in accordance with the "Determination of loss on drying" method described.

Moisture correction Table for dibutyl phthalate absorption - anhydrous

| % water | % water | | | | |
|---|---|---|---|---|---|
| | .0 | .2 | .4 | .6 | .8 |
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 27 | 28 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

Determination of 60° and 85° Reflectometer Value

The effect exerted on reflectance as a result of deliberate roughening of coating film surfaces is the outstanding property of matting agents based on $SiO_2$. The reflectometer value was therefore an important criterion for characterizing matted lacquer films.

Prerequisites for the measurement were that the lacquer film surfaces to be measured be planar, clean and cured.

The measurement was carried out on at least 3 representative sites of the sample by means of a reflectometer with measuring geometry according to DIN 67530 (e.g., Haze-gloss, BYK-Instruments). If the individual measurements deviated from one another too greatly, then generally a further measurement was carried out at representative sites, or the number of individual measurements was increased to >3. On the BYK haze-gloss the display showed the standard deviation of the measurements. If the standard deviation s was >0.5 it was advisable to carry out the aforementioned measures. The mean value was reported to 1 decimal place.

In the characterization of matted lacquer film surfaces it has been found appropriate to carry out measurements with the 60° and the 85° measuring geometries. In deviation from DIN 67530, therefore, the reflectometer values of matted lacquer film surfaces were determined using both measuring geometries.

Determination of Transparency as Black Number $M_y$

The black number $M_y$ was determined by a method based on DIN 55979, using the Pausch Q-Color 35 instrument.

Beforehand the clearcoat material for investigation was prepared in accordance with formulas 1 or 2 and, where appropriate, was matted with a silicon dioxide. This coating material was applied using a 60 μm slot doctor blade onto a high-gloss black-colored glass plate (format 180×80×60 mm, Art. No. P 2071035, manufacturer: Berliner Glas KG, Herbert Kubatz GmbH & Co.) (application rate 25 mm/s by means of Coatmaster 509 MC, Erichsen). Subsequently the samples of coating material were dried in a forced air drying cabinet at 80° C. for 1 h.

The black number $M_y$ was measured on the glass plate thus prepared in accordance with DIN 55979.

The $M_y$ value provides information on the depth of color and transparency of the clearcoat material. The higher this value the more transparent the coating material. At the same time there was an increase in the depth of color. It should be ensured that the coating material has been matted so as to give comparable 60° reflectometer values. Only in that case it was possible to compare the values for the black number $M_y$.

Determination of Soft-Feel Effect

The soft-feel effect is a tactile parameter which can only be assessed subjectively, by contact. By stroking and feeling with the hand and the fingertips over the coating-material surfaces under test, the personal sensation of the tactile properties is assessed. Ratings from 1 to 5 were awarded as follows:

1=plasticky, hard surface (no soft-feel effect),

2=paintlike, smooth surface,

3=perceptible change in the surface toward a silky character (slight soft-feel effect), 4=rubberlike or leatherlike surface (pronounced soft-feel effect), 5=velvety surface (strongly pronounced soft-feel effect).

Determination of Flow Time

The flow time is the time required by a fixed volume of a liquid medium to flow completely from a standardized flow cup (DIN cup 4 mm according to DIN 53211 with stand).

The temperature of the lacquer and of the 4 mm DIN cup must be 23°±0.5° C. before and during the flow time measurement.

The 4 mm DIN cup was fixed on the stand so that its top edge is aligned horizontally. The flow nozzle was sealed with a finger, and the lacquer, free from bubbles and impurities, was introduced into the 4 mm DIN cup so that the liquid runs over the inside edge of the brim of the cup. Filling must not be accompanied by the introduction into the sample of any air bubbles. Then, using a glass plate or a sheet of card, lacquer protruding beyond the brim was taken off.

The measurement of flow time began with the release of the lower aperture of the flow nozzle; it ended as soon as the string of liquid below the flow nozzle broke off for the first time. The flow time was reported with an accuracy of 1 second.

EXAMPLES

The following examples are intended to illustrate the present invention without restricting its scope.

The silicon dioxides used for the performance investigations described below were as follows:

Conventional Silicon Dioxides:

Silicon Dioxide 1:

Pergopak M 3 (Albemarle, Technical data sheet of 12/2002) mixed with Acematt OK 412 (Degussa A G, Technical data sheet of 12/2002) in a 3:1 weight ratio (see Bayer A G, brochure Wassrige Soft-feel-Lackierungen für Kunststoffe mit Bayhydrol®/Bayhydur®/Desmodur®, [Aqueous soft-feel coatings for plastics with Bayhydro®/Bayhydur®/Desmodur®], LS 5800, p. 10, June 2003)

Surface-modified silicon dioxides of the present invention:

Silicon Dioxide 2:

Silicon dioxide 2 was prepared using:

The hydrophilic pyrogenic silica (Aerosil 300) having the following physicochemical properties:

| | |
|---|---|
| BET specific surface area [m²/g]: | 290.0 |
| pH: | 4.2 |
| Tapped density [g/l]: | 35 |
| Loss on drying [%]: | 0.8 |
| DBP, anhydrous [g/100 g]: | 305.0 |
| C content [% by weight]: | 0. |

The coating agent (TEGO Foamex 845, TEGO GmbH, Technical data sheet of 01/2004), a polysiloxane emulsion, had the following physicochemical properties:

| | |
|---|---|
| Form: | thixotropic liquid |
| Color: | white |
| Odor: | slight inherent odor |
| Boiling temperature: | about 100° C. |
| Density: | about 1 g/cm³ (at 20° C.) |
| Water solubility | Miscible |
| pH: | 5-8 (at 20° C. in original state) |

The coating agent consisted of 656.4 g of an aqueous polysiloxane emulsion which was diluted with 210 g of water. The pH of the coating agent was adjusted to 11.3 by adding NH$_4$OH. 0.865 kg of coating agent was sprayed at room temperature, using a dual-fluid nozzle, onto 2 kg of the pyrogenic silica. This mixing vessel used was a plowshare mixer. The loss on drying of the material thus moistened was 24.4%.

The moistened material was ground in a gas jet mill (throughput: 7 kg/h) and subsequently dried at 120° C. for 13 h.

Silicon Dioxide 3:

The material used was the hydrophilic pyrogenic silica (Aerosil 300) having the following physicochemical properties:

| | |
|---|---|
| BET specific surface area [m²/g]: | 290.0 |
| pH: | 4.2 |
| Tapped density [g/l]: | 35 |
| Loss on drying [%]: | 0.8 |
| DBP number [%]: | 305.0 |
| C content [% by weight]: | 0 |

The following surface modifier was used (Dow Corning DY 33 Additive, product data sheet of Feb. 25, 2003), which was a silicone elastomer having epoxy functions:

| | |
|---|---|
| Appearance: | white, aqueous liquid |
| Mean particle size: | 2-4 μm |
| Viscosity: | 40-200 mPas |
| Solids content: | 50% by weight |
| Suspension type: | anionic |
| Hardness of solid: | 70 (Shore hardness A) |

The surface modifier was used in the form of a 50% aqueous suspension whose pH was adjusted to 10.5 by adding NH$_4$OH. 0.909 kg of the surface modifier was sprayed at room temperature, using a dual-fluid nozzle, onto 2 kg of the pyrogenic silica. The mixing vessel used was a plowshare mixer. The loss on drying of the material thus moistened was 15.9%.

The moistened material was ground in a gas jet mill (throughput: 7 kg/h) and then dried at 120° C. for 13 h.

Silicon dioxides 2 and 3 had the physicochemical parameters listed below in Table 1:

TABLE 1

| | Organ. Mod. | Tapped density g/l | LD % | LOI % | C % % weight | pH | DBP (anhydrous) g/100 g |
|---|---|---|---|---|---|---|---|
| Silicon dioxide 2 (per invention) | polysiloxane | 24 | 1.6 | 4.9 | 3.0 | 6.5 | 323[1] |
| Silicon dioxide 3 (per invention) | polysiloxane elastomer | 23 | 1.4 | 6.2 | 5.4 | 5.6 | 322[2] |

[1] DBP (original) = 310 g/100 g,
[2] DBP (original) = 310 g/100 g.

Use Example 1

1-Component Soft-Feel Lacquer

A lacquer was produced in accordance with formula 1. The raw material of item 1 was charged to a 5 l stainless steel container (diameter: 185 mm). While stirring with a dissolver (dissolver disk diameter: 80 mm) at 1000 rpm, the raw materials of items 2 and 6 were added. This was followed by further dispersion at 1500 rpm for 10 minutes.

Silicon dioxide was added to 100 g of the lacquer prepared in this way. The initial mass of silicon dioxide was chosen so that all of the samples have comparable 60° reflectometer values of from 0 to 3, since comparison of transparency was possible only if the gloss was the same (for initial mass see Table 2). Following the addition, dispersion was carried out at 2000 rpm for 10 minutes using a dissolver (dissolver disk diameter: 45 mm).

Thereafter the spray viscosity of the lacquer was adjusted to a flow time of 21 s by a further incorporation of deionized water. Following removal of air, the lacquer material was applied by spraying (1.5 spray passes=threefold spraying of the plate in vertical direction and subsequent rotation of the plate by 90°) to plastic sheets consisting of Bayblend T 65 (Bayer A G, Technical data sheet of Feb. 25, 2004).

The transparency as black number $M_y$, the gloss, and the soft-feel effect were measured.

Formula 1:

| Item | | Initial mass in g |
|---|---|---|
| 1 | U 420 (Alberdingk, Technical data sheet of Feb. 11, 2003) | 3160.0 |
| 2 | BYK 346 (Byk-Chemie, Technical data sheet of November 2003) | 40.0 |
| 3 | BYK 24 (Byk-Chemie, Technical data sheet of May 2004) | 26.0 |
| 4 | Dow Corning 67 (Dow Corning, Technical data sheet of Aug. 07, 2000) | 22.0 |
| 5 | Butyl glycol | 152.0 |
| 6 | Deionized water | 600.0 |
| | Total | 4000.0 |

The results are summarized in Table 2.

TABLE 2

| Lacquer formulation with | Coating agent for SiO$_2$ | Initial mass in g | 60° reflectometer value | Black number $M_y$ | Soft-feel effect |
|---|---|---|---|---|---|
| Silicon dioxide 1 (Conventional) | PE wax | 8.0 | 0.5 | 138 | 1 |
| Silicon dioxide 2 (as per present invention) | Polysiloxane | 6.0 | 0.7 | 148 | 4 |
| Silicon dioxide 3 (as per present invention) | Polysiloxane elastomer | 6.0 | 0.7 | 145 | 5 |

Use Example 2

2-Component Lacquer

A lacquer was prepared in accordance with formula 2. The raw materials of items 1 and 2 were charged to a 5l stainless steel container (diameter: 185 mm) and dispersed using a dissolver (dissolver disk diameter: 80 mm) at 2000 rpm for 5 minutes. Thereafter component 3 was added and dispersion was continued at 2000 rpm for 5 minutes. Finally components 4 and 5 were added and dispersion was repeated at 2000 rpm for 5 minutes.

Silicon dioxide was added to 100 g of the lacquer prepared in this way. The initial mass of silicon dioxide was chosen so that all of the samples have comparable 60° reflectometer values of from 0 to 3, since the transparency can only be compared if the gloss was the same (for initial mass see Table 3). Following the addition dispersion took place using a dissolver (dissolver disk diameter: 45 mm) at 2000 rpm for 10 minutes. Subsequently, the curing agent, Desmodur N 3390 (Bayer A G, Technical data sheet of Jan. 1, 2001), was added and dispersion was continued with the dissolver at 1000 rpm for 1 minute.

Thereafter, the spray viscosity of the lacquer was adjusted to a flow time of 21 s by a further incorporation of butyl acetate 98%/Shellsol A (weight ratio 2.5:1). Following the removal of air the lacquer was applied by spraying (1.5 spray passes) to plastic sheets consisting of Bayblend T 65 (Bayer A G, Technical data sheet of Feb. 25, 2004).

The transparency as black number $M_y$, the gloss, and the soft-feel effect were measured.

Formula 2

| Item | | Initial mass in g |
|---|---|---|
| 1 | Synthalat A-HD 5667 (Synthopol Chemie, Technical data sheet of December 2002) | 434.0 |
| 2 | n-Butyl acetate 98% | 1462.0 |
| 3 | Synthoester 1179 (Synthopol Chemie, Technical data sheet of December 2002) | 1646.0 |
| 4 | Shellsol A 100 (Shell Chemicals, Technical data sheet of Feb. 12, 2003) | 366.0 |
| 5 | Dibutyltin laurate 2% in xylene | 92.0 |
| | Total | 4000.0 |

The results are summarized in Table 3.

TABLE 3

| Coating formulation with | Coating agent for SiO$_2$ | Initial mass in g | 60° reflectometer value | Black number $M_y$ | Soft-feel effect |
|---|---|---|---|---|---|
| Silicon dioxide 1 (conventional) | PE wax | 10.0 | 0.2 | 135 | 1 |
| Silicon dioxide 2 (as per present invention) | Polysiloxane | 5.5 | 0.2 | 150 | 4 |
| Silicon dioxide 3 (as per present invention) | Polysiloxane elastomer | 5.5 | 0.3 | 144 | 5 |

German patent application 10 2004 029 074.1 filed Jun. 6, 2004, is incorporated herein by reference.

Numerous modifications and variations on the present invention are possible in light of the above teachings. It is therefore to be understood that within the scope of the appended claims, the present invention may be practiced otherwise than as specifically described herein.

The invention claimed is:

1. A lacquer formulation, comprising: 0.5 to 15% by weight of at least one surface-modified silicon dioxide having a 60° reflectometer value of <3 and a black number $M_y$ of at least 140; and a clearcoat material;
wherein a thermoplastic elastomer, is used as surface modifying agent to prepare said surface-modified silicon dioxide; and
wherein said lacquer formulation is a matted lacquer formulation and wherein said thermoplastic elastomer is a dimethylpolysiloxane elastomer having terminal epoxy groups and a molecular weight of more than 100 000.

2. The lacquer formulation as claimed in claim 1, further comprising a pigmented lacquer.

3. The lacquer formulation as claimed in claim 1, wherein said at least one surface-modified silicon dioxide is at least one surface-modified precipitated silica alone or in a mixture with at least one other surface-modified silicon dioxide.

4. The lacquer formulation as claimed in claim 1, wherein said at least one surface-modified silicon dioxide is at least one surface-modified silica based on pyrogenic silica, alone or in a mixture with at least one other surface-modified silicon dioxide.

5. The lacquer formulation as claimed in claim 1, wherein said at least one surface-modified silicon dioxide is at least one surface-modified pyrogenic silica alone or in a mixture with at least one other surface-modified silicon dioxide.

6. The lacquer formulation as claimed in claim 1, wherein said at least one surface-modified silicon dioxide is at least one surface-modified silica gel alone or in a mixture with at least one other surface-modified silicon dioxide.

7. The lacquer formulation as claimed in claim 1, wherein said at least one surface-modified silicon dioxide has a carbon content of 0.5%-30% by weight.

8. The lacquer formulation as claimed in claim 1, wherein said at least one surface-modified silicon dioxide has a DBP (dibutylphthalate) number of 100-600 g/100 g, preferably 200-450 g/100 g under anhydrous conditions.

9. The lacquer formulation as claimed in claim 1, wherein said at least one surface-modified silicon dioxide has a mean particle size $d_{50}$ of 0.5-50 µm.

10. The lacquer formulation as claimed in claim 1, wherein said at least one surface-modified silicon dioxide has a pH<8.

11. The lacquer formulation as claimed in claim 1, further comprising:
    i) 5-99.5% by weight solids of a polymer component or of a mixture of two or more physically or chemically crosslinking polymer components;
    ii) 0-80% by weight of a low molecular mass component which acts as solvent, or of a mixture of such low molecular mass components; and
    iii) mixtures of i) and ii).

12. The lacquer formulation as claimed in claim 1, further comprising at least one binder selected from the group consisting of a polymer of (meth)acrylic acid, a polymer of (meth)acrylic acid ester, a copolymer of (meth)acrylic acid with an olefinically unsaturated compound, a copolymer of (meth)acrylic acid ester with an olefinically unsaturated compound; polyether polyols, polyester polyols, polycarbonate polyols, polyurethane polyols, epoxy resins, and fatty-acid-modified alkyd resins prepared by polycondensation wherein said polymer of (meth)acrylic acid, said polymer of (meth)acrylic acid ester, said copolymer of (meth)acrylic acid and said copolymer of (meth)acrylic acid ester optionally carry a further functional group.

13. The lacquer formulation as claimed in claim 1, wherein said thermoplastic elastomer is are prepared by:
(I) mixing
   (B) a rheologically stable polyamide resin which has a melting point or glass transition temperature of from 25° C. to 275° C.;
   (B) a silicone base which comprises:
      (B') 100 parts by mass of a diorganopolysiloxane rubber which has a plasticity of at least 30 and has on average at least 2 alkenyl groups in its molecule,
      (B") from 5 to 200 parts by mass of a reinforcing filler, the mass ratio between the silicone base and the polyamide resin being greater than 35:65 to 85:15
   (C) for each 100 parts by mass of the polyamide resin a compatibilizer which is selected from:
      (i) from 0.1 to 5 parts by mass of an adhesion promoter which has a molecular weight below 800 and contains at least two groups in its molecule that are selected independently from ethylenically unsaturated groups, epoxy, anhydride, silanol, carboxyl, oxazoline and alkoxy having 1 to 20 carbon atoms,
      (iv) from 0.1 to 10 parts by mass of a functional diorganopolysiloxane which contains in its molecule at least one group which is selected from epoxy, anhydride, silanol, carboxyl, amine, oxazoline and alkoxy having 1 to 20 carbon atoms, and
      (v) from 0.1 to 10 parts by mass of a copolymer which includes at least one diorganopolysiloxane block and at least one block which is selected from polyamide, polyether, polyurethane, polyurea, polycarbonate and polyacrylate;
   (D) an organohydrido-silicon compound which contains on average at least two silicon-bonded hydrogen groups in its molecule; and
   (E) a hydrosilylation catalyst, components (D) and (E) being present in an amount sufficient to vulcanize the diorganopolysiloxane (B'); and
(II) dynamically vulcanizing the diorganopolysiloxane (B').

14. A method for coating an article, comprising:
contacting said article with a lacquer formulation as claimed in claim 1.

15. The method according to claim 14, wherein said article comprises a material selected from the group consisting of a plastic, a natural leather, a synthetic leather and combinations thereof.

16. An article, coated with a lacquer formulation as claimed in claim 1.

17. A lacquer formulation, comprising:
0.5 to 15% by weight of at least one surface-modified silicon dioxide having a 60° reflectometer value of <3 and a black number $M_y$ of at least 140; and
a clearcoat material;
wherein a thermoplastic elastomer is used as surface modifying agent to prepare said surface-modified silicon dioxide; wherein said thermoplastic elastomer is a dimethylpolysiloxane elastomer having terminal epoxy groups and a molecular weight of more than 100 000
wherein said lacquer formulation is a matted lacquer formulation;
said lacquer formulation comprising:
i) 5-99.5% by weight solids of a polymer component or of a mixture of two or more physically or chemically crosslinking polymer components; or
ii) 0-80% by weight of a low molecular mass component which acts as solvent, or of a mixture of such low molecular mass components; and
iii) mixtures of i) and ii).

18. The lacquer formulation as claimed in claim 17, wherein said thermoplastic elastomer is are prepared by:
(I) mixing
   (A) a rheologically stable polyamide resin which has a melting point or glass transition temperature of from 25° C. to 275° C.;

(B) a silicone base which comprises:
  (B') 100 parts by mass of a diorganopolysiloxane rubber which has a plasticity of at least 30 and has on average at least 2 alkenyl groups in its molecule,
  (B") from 5 to 200 parts by mass of a reinforcing filler, the mass ratio between the silicone base and the polyamide resin being greater than 35:65 to 85:15
(C) for each 100 parts by mass of the polyamide resin a compatibilizer which is selected from:
  (i) from 0.1 to 5 parts by mass of an adhesion promoter which has a molecular weight below 800 and contains at least two groups in its molecule that are selected independently from ethylenically unsaturated groups, epoxy, anhydride, silanol, carboxyl, oxazoline and alkoxy having 1 to 20 carbon atoms,
  (ii) from 0.1 to 10 parts by mass of a functional diorganopolysiloxane which contains in its molecule at least one group which is selected from epoxy, anhydride, silanol, carboxyl, amine, oxazoline and alkoxy having 1 to 20 carbon atoms, and
  (iii) from 0.1 to 10 parts by mass of a copolymer which includes at least one diorganopolysiloxane block and at least one block which is selected from polyamide, polyether, polyurethane, polyurea, polycarbonate and polyacrylate;
(D) an organohydrido-silicon compound which contains on average at least two silicon-bonded hydrogen groups in its molecule; and
(E) a hydrosilylation catalyst, components (D) and (E) being present in an amount sufficient to vulcanize the diorganopolysiloxane (B'); and
(II) dynamically vulcanizing the diorganopolysiloxane (B').

* * * * *